United States Patent [19]

Ishihara et al.

[11] Patent Number: 5,678,650
[45] Date of Patent: Oct. 21, 1997

[54] DRIVE CONTROL SYSTEM FOR AUTOMOTIVE VEHICLE

[75] Inventors: Toshihiro Ishihara; Takahiro Inada; Tsunehisa Okuda, all of Hiroshima-ken, Japan

[73] Assignee: Mazda Motor Corporation, Hiroshima, Japan

[21] Appl. No.: 268,917

[22] Filed: Jun. 30, 1994

[30] Foreign Application Priority Data

Jun. 30, 1993 [JP] Japan ................... 5-160952

[51] Int. Cl.$^6$ ................ B60R 21/00; B60K 31/00
[52] U.S. Cl. .............. 180/169; 180/170; 364/426.04
[58] Field of Search ...................... 180/167, 169, 180/170, 271; 364/426.01, 426.04, 424.01, 460

[56] References Cited

U.S. PATENT DOCUMENTS

| | | | |
|---|---|---|---|
| 5,173,859 | 12/1992 | Deering | 364/426.04 |
| 5,177,462 | 1/1993 | Kajiwara | 180/167 |
| 5,197,562 | 3/1993 | Kakinami et al. | 180/169 |
| 5,349,430 | 9/1994 | Yamamoto et al. | 180/167 |
| 5,373,446 | 12/1994 | Mizukoshi | 364/426.01 |
| 5,396,426 | 3/1995 | Hibino et al. | 180/170 |
| 5,450,057 | 9/1995 | Watanabe | 180/169 |

FOREIGN PATENT DOCUMENTS

| | | |
|---|---|---|
| 55-86000 | 6/1980 | Japan . |
| 61-150835 | 7/1986 | Japan . |
| 1-114550 | 6/1989 | Japan . |
| 405096979 | 4/1993 | Japan .............. 180/167 |

*Primary Examiner*—Anne Marie Boehler
*Attorney, Agent, or Firm*—Keck, Mahin & Cate

[57] ABSTRACT

A vehicle drive control system performs a speed control, in which the vehicle is controlled to travel at a desired cruising speed, and a distance control, in which the vehicle is controlled to keep a safe distance from a vehicle ahead of the vehicle with the drive control. The system is equipped with a feature in which a speed of the preceding vehicle is estimated when a range finder, which monitors a distance from the preceding vehicle, loses sight of the preceding vehicle during the distance control so as to establish a target cruising speed which the subject vehicle ought to attain according to the estimated speed of the preceding vehicle.

16 Claims, 4 Drawing Sheets

DRIVE CONTROL SYSTEM FOR AUTOMOTIVE VEHICLE

BACKGROUND OF THE INVENTION

1. Field of the Invention

The present invention relates to an automotive vehicle drive control system for cruise control and control of a distance between a subject vehicle and object vehicle. More particularly, this invention relates to an automotive vehicle drive control system for controlling a subject vehicle speed during a transition from distance control to cruise control when the subject vehicle has lost sight of the object vehicle.

2. Description of Related Art

In recent years, automotive vehicles have been equipped, as drive control systems, with distance control systems for automatically keeping a safe distance between the vehicle (which is hereafter referred to as the subject vehicle) and a vehicle running ahead of the subject vehicle (which is hereafter referred to as an object or preceding subject vehicle). These drive control systems have been used in addition to cruise control systems, which control the subject vehicle so that it travels or cruises at a desired constant speed. Such a distance control system includes a radar type distance detector, such as an infrared laser radar and the like, for detecting the distance between the subject vehicle captured within the limited sight of the detector and a preceding object vehicle. This kind of distance control system detects the preceding object vehicle speed and changes it so as to keep the subject vehicle at a safe distance from the preceding object vehicle according to the detected preceding object vehicle speed, thereby permitting the subject vehicle to follow the preceding object vehicle safely. If the distance control system does not detect any preceding object vehicles within the safe distance accorded to the present subject vehicle speed, it accelerates the subject vehicle to a cruising speed which is previously selected and continuously keeps it at the cruising speed. Such a distance control system is known from, for instance, Japanese Unexamined Patent Publication No. 55-86000.

While a vehicle equipped with a distance control system of this kind is travelling on a curved or "snaky" road, the radar type distance detector often loses sight of a preceding object vehicle, even at a close distance, within a safe distance. In such a case, the control system may mistakenly increase the subject vehicle speed to the preset cruising speed. If the cruising speed has been preset to a speed higher than, for instance, a safe speed at which the subject vehicle may enter a curve, the subject vehicle may be accelerated quickly to the cruising speed before reaching the curve and most likely will approach the curve at an unsafe speed and/or be suddenly drawn toward the preceding object vehicle.

In an attempt to avoid such a problem, some distance control systems are designed and configured such that if, in fact, the distance control system loses track of the distance between the subject vehicle and a preceding object vehicle running ahead of the subject vehicle, it automatically resets the cruising speed to the current speed of the subject vehicle and accelerates or decelerates the subject vehicle to the reset cruising speed. Such an improved distance control system is disclosed in, for instance, Japanese Unexamined Patent Publication No. 61-114550. Further, as is described in, for instance, Japanese Unexamined Patent Publication No. 1-150835, another distance control system is configured to reset a cruising speed to a lower speed between a current subject vehicle speed, determined when sight of a preceding object vehicle is lost, and a preset cruising speed.

Even in a distance control system equipped with a "safety first" feature, if the system becomes ineffective while the subject vehicle is traveling faster than and, therefore, approaches a preceding object vehicle, the subject vehicle can not be prevented from approaching the preceding object vehicle.

SUMMARY OF THE INVENTION

It is an object of the present invention to provide a drive control system which prevents a subject vehicle from unusually approaching a preceding object vehicle even when it falls into circumstances which render it ineffective in detecting the distance from the preceding object vehicle.

It is another object of the present invention to provide a drive control system which resets the cruising speed to an appropriate speed when it falls into circumstances rendering it ineffective in detecting the distance from the preceding object vehicle.

The above objects of the present invention are accomplished by providing a vehicle drive control system having a distance detection device which detects a distance between the subject vehicle and a preceding object vehicle running ahead and within the sight of the distance detection device for controlling a speed of the subject vehicle so that the subject vehicle travels at a desired cruising speed and keeps a desired safety distance from the preceding object vehicle. A control means estimates a speed of the preceding object vehicle when the distance detection device has lost sight of the preceding vehicle during distance control and establishes a target speed which the vehicle ought to attain as a cruising speed according to the estimated preceding object vehicle.

Specifically, the target cruising speed is established at, or set to, either one of the speeds of the two vehicles which is lower than another or, otherwise, to a middle speed between the speeds of the two vehicles and, thereafter, to the preceding object vehicle speed when a predetermined time has passed. The estimation of the preceding object vehicle speed is made by using an extrapolation method in which a relative speed between the two vehicles, sampled before the moment of disappearance of the preceding object vehicle from the sight of the distance detection device, is subtracted from the subject vehicle speed. Otherwise, a relative speed between the two vehicles, sampled right before the moment of disappearance of the preceding object vehicle from the sight of the distance detection device, may be substituted for the preceding object vehicle speed after its disappearance.

BRIEF DESCRIPTION OF THE DRAWINGS

The above and other objects and features of the present invention will be clearly understood from the following description of a preferred embodiment thereof when considered in conjunction with the accompanying drawings, in which.

DETAILED DESCRIPTION OF THE PREFERRED EMBODIMENTS

Figure 1:
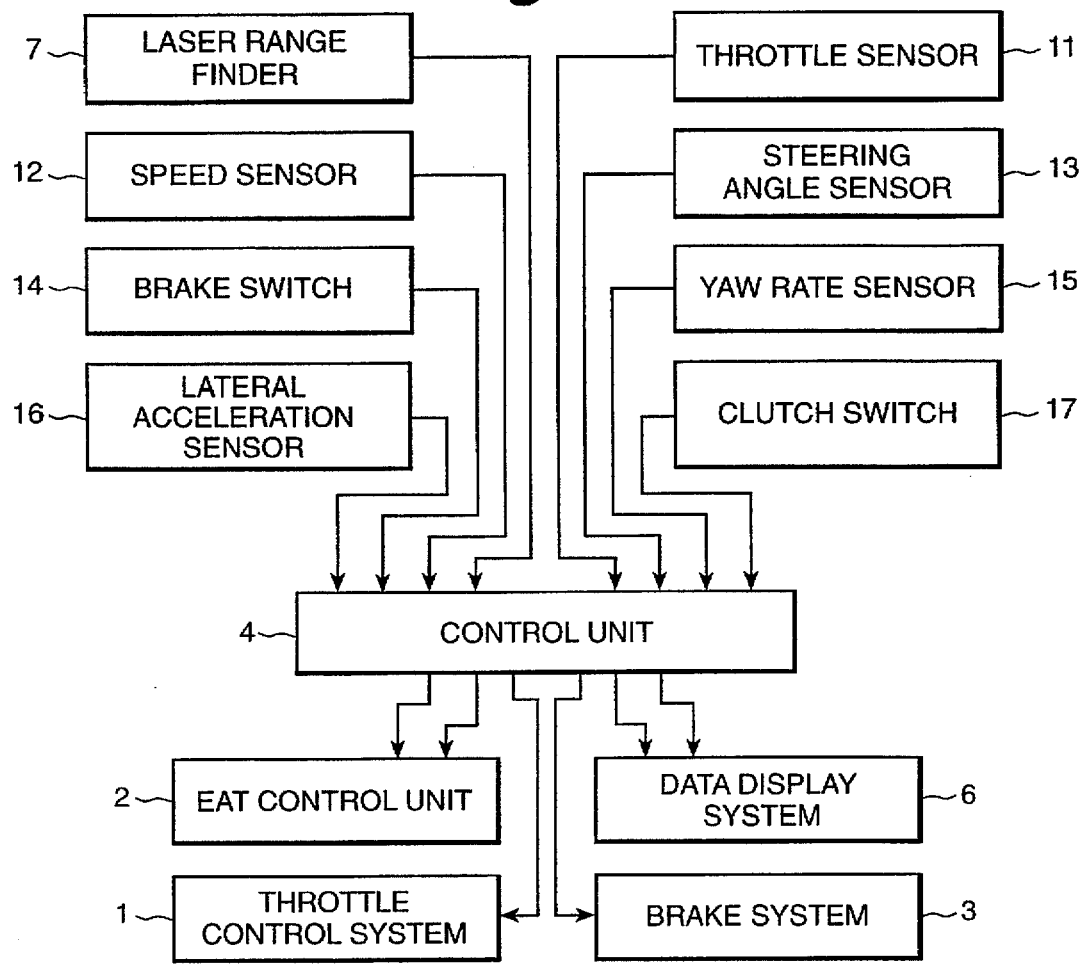
FIG. 1 is a block diagram illustrating a drive control system for an automotive vehicle in accordance with a preferred embodiment of the present invention.
Figure 2:
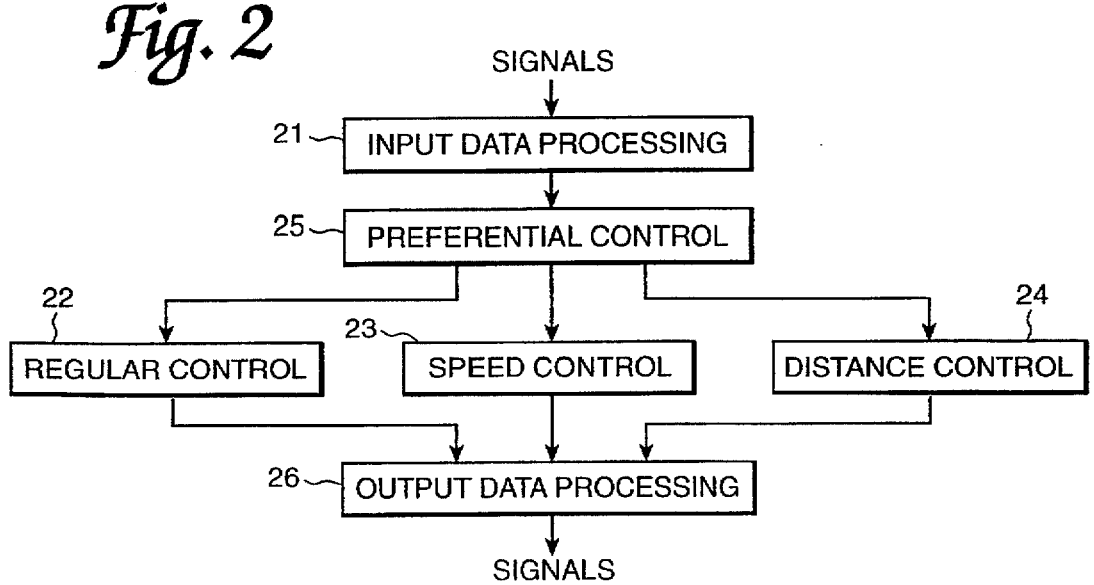
FIG. 2 is a block diagram illustrating a control unit of the drive control system.

Referring now to the drawings in detail and, in particular, to FIG. 1, which is a block diagram schematically illustrating a drive control system DSC for a vehicle (which is referred to as a subject vehicle so as to distinguish it from others) in accordance with a preferred embodiment of the present invention, the drive control system DCS controls a throttle control system 1, an electronic automatic transmission control system 2 and a braking control system 3 to apply a brake so as to adjust the speed of the vehicle. The automatically controlled throttle device 1 includes and controls an engine throttle (not shown) to automatically open and close it according to driving conditions and/or a driver's demands. The automatic braking system 3 automatically regulates braking force applied to each of wheels. These systems 1–3 are well known per se and may be of any known type. These systems 1–3 are systematically controlled by a control unit 4 on the basis of driving conditions detected by various devices and sensors which will be described later. The drive control system DCS includes an information display device 6 provided on an instrument panel (not shown) or the like of the vehicle for providing various information, such as warning and diagnostic results of driving conditions, for the driver. Specifically, the information display device 6 gives the driver a warning with a lamp indicating that the vehicle has reached or is within an unsafe distance and displays a visual image of the diagnostic results of driving conditions on its screen.

A laser radar type of distance detecting device or laser range finder 7, which is per se well known to those skilled in the art and may be of any well known type, detects the distance between the subject vehicle and a vehicle ahead (which is hereafter referred to as a preceding object vehicle) captured within a limited angle of sight. The device provides and sends a signal representative of the detected distance to the control unit 4. The laser range finder 7 radiates a laser beam forward and receives it after it is reflected by the preceding subject vehicle. As a lapse of time from the initiation of laser beam radiation to the reception of reflected laser beam is proportional to the distance between the laser range finder 7 and an object vehicle, the laser range finder 7 detects the time required for the laser beam to make a round-trip between them and finds the distance between the two vehicles based on the time detected. The control unit 4 further receives various signals, including a throttle signal representative of an opening of the engine throttle from a throttle opening sensor 11, a speed signal representative of a subject vehicle speed from a speed sensor 12, an angle signal representative a steering angle from an angle sensor 13, a brake signal indicative of the application of a brake from a brake switch 14, a signal representing a yaw rate of the vehicle from a yaw rate sensor 15, an acceleration signal representative of a lateral acceleration from an acceleration sensor 16, and a clutch signal indicative of the application of a clutch from a clutch switch 17. All of these sensors and switches 11–17 are well known per se to those skilled in the art and may be of known types. In addition, the control unit 4 receives signals from various sensors and switches relating to drive elements or devices which are not related directly to the distance and speed control but to general control.

The control unit 4 is composed of a micro-computer and has various functional blocks, namely a drive control block 22, a cruising speed control block 23, a distance control block 24 and a preferential control block 25 in addition to an input data processing block 21 and an output data processing block 26. The drive control block 22 performs the general drive control according to the driver's demands. The cruising speed control block 23 functions to control the vehicle so that it travels at a constant cruising speed which has been previously set. The distance control block 24 functions to control the safe distance of the vehicle from the preceding object vehicle according to the subject vehicle speed. Further, the preferential control block 25 preferentially causes any one of the control blocks 22–24, according to the signals from the device, sensors and switches 1 and 11 to 17, to be processed in the input data processing block 21. After a control command signal, provided from each of these control blocks 22–24, has been processed in the output data processing block 26, it is forwarded to at least one of the control systems 1–3 and also to the information display device 6.

Figure 3:
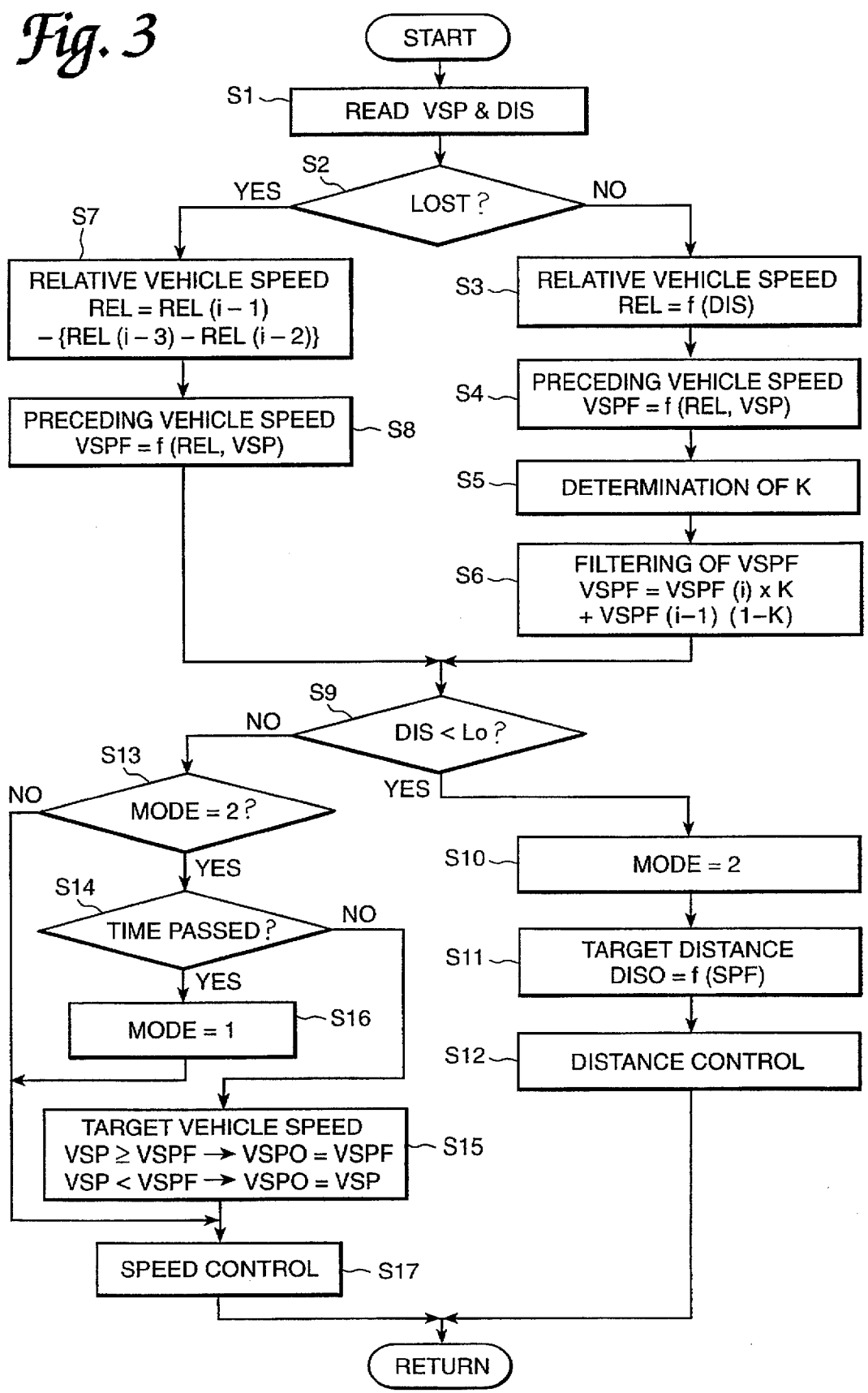
FIG. 3 is a flow chart showing a drive control routine when a preceding vehicle is lost from sight.

The operation of the drive control system DCS of the present invention is best understood by reviewing FIG. 3, which is a flow chart illustrating a cruising speed and distance control routine for the microcomputer of the control unit 4. Programming a computer is a skill well understood in the art. The following description is written to enable a programmer having ordinary skill in the art to prepare an appropriate program for the microcomputer. The particular details of any such program would, of course, depend upon the architecture of the particular computer selected.

Referring to FIG. 3, the control starts and directly proceeds to step S1 at which signals provided by the devices and the sensors and switches 11–17 are read to find a speed of the subject vehicle VSP and a distance of the subject vehicle DIS from a preceding object vehicle. Subsequently, a first decision is made at step S2 as to whether the laser range finder 7 has lost sight of the preceding object vehicle. In this instance, in the event of disappearance of a signal from the laser range finder 7 or, if a signal from the laser range finder 7 indicates an unacceptably long distance, it is determined that the laser range finder 7 has lost sight of the preceding object vehicle or, otherwise, that the preceding object vehicle has disappeared out of sight of the laser range finder 7. If the answer to this decision is "NO," this indicates that the laser range finder 7 continuously acquires the preceding object vehicle. Then, the control unit 4 calculates a change rate in the distance DIS between the two vehicles per unit time to find a relative vehicle speed REL between the two vehicles which is expressed in the form of a function of the distance between the two vehicles DIS. Specifically, the distance change rate is calculated by dividing the difference between the last sampled distance DIS (i−1) and the currently sampled distance DIS (i) by a periodic sampling time $\Delta$, for instance 7 milliseconds.

At step S4, a speed of the preceding object vehicle (which is hereafter referred to as a preceding object vehicle speed) VSPF is subsequently calculated. A current preceding object vehicle speed VSPF(i) is obtained by subtracting the current relative vehicle speed REL(i) from a speed of the subject vehicle (which is hereafter referred to as a subject vehicle speed) VSP. Then, after the determination of a filtering coefficient K has been made at step S5, the currently sampled preceding object vehicle speed VSPF(i) is subjected to filtering with the use of a filtering coefficient K at step S6. In this instance, the filtering coefficient K is given by a function of distance DIS between the two vehicles, relative vehicle speed REL, steering angle HAND and acceleration or deceleration GSV of the subject vehicle expressed as follows:

$$K=(C1/DIS_2)+(C2/REL_2)+(C3/HAND_2)+(C4/GSV_2)$$

In this function, C1–C4 are constants. The acceleration or deceleration GSV of the subject vehicle is calculated by dividing the difference between the last sampled subject vehicle speed VSP(i−1) and the currently sampled subject vehicle speed VSP(i) by a periodical sampling time Δ of 7 milliseconds. The filtering is performed by the use of the following formula for the preceding object vehicle speed VSPF:

$$VSPF=VSPF(i) \times K+VSPF(i-1) \times (K-1)$$

In this formula, VSPF(i) and VSPF(i−1) are the preceding object vehicle speed VSPF during the last (i−1) and current (i) sampling routines, respectively, and the filtering coefficient K takes a value between zero (0) and one (1). This filtering is conducted for smoothing of actually sampled data so a to provide an improvement in the accuracy of data.

On the other hand, if the answer to the decision made at step S2 is "YES," this indicates that the laser range finder 7 has lost sight of the preceding vehicle. Then, at step S7, a relative speed REL between the two vehicles is calculated in extrapolation by the use of the following formula:

$$REL(i)=REL(i-1)-\{REL(i-3)-REL(i-2)\}$$

In this formula, REL(i−1), REL(i−2) and REL(i−3) are the last three relative speeds between the two vehicles. Subsequently, a speed is estimated as a current preceding subject vehicle speed VSPF(i) at step S8 wherein a calculation of VSP(i)−REL(i) is made. The functions of step S7 estimate the preceding subject vehicle speed based on the data representative of relative vehicle speeds immediately before the laser range finder 7 loses sight of the preceding object vehicle rather than data representative of a current relative vehicle speed.

Figure 4:
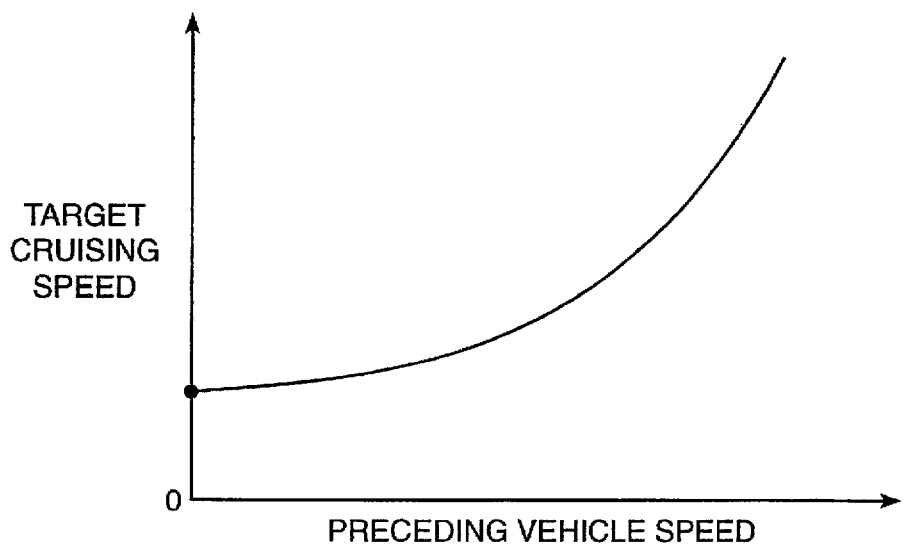
FIG. 4 is a diagram showing a target distance map with respect to a preceding vehicle speed.
Figure 5:
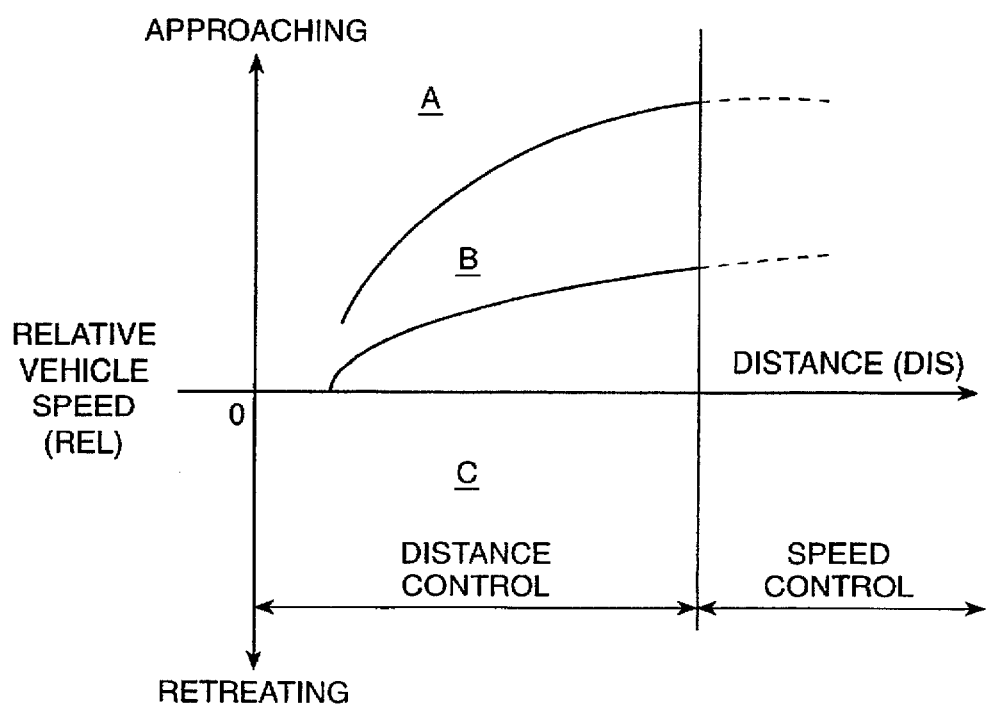
FIG. 5 is a diagram showing three zones of dangerous levels of relative vehicle speed for the control of vehicle speed.

After the filtering of a preceding object vehicle speed at step S6 or after the extrapolation of preceding subject vehicle speed at step S8, a decision is made at step S9 as to whether the distance DIS between the two vehicles is greater than a predetermined distance Lo. In other words, a decision is made as to whether there is any object vehicle running ahead of the subject vehicle within the predetermined distance Lo. If the answer to this decision is "YES," then, after a control mode has been set to MODE 2 at step S10 for the distance control, a desirable distance DIS between the two vehicles is obtained from a distance map shown in FIG. 4 at step S11. The setting of MODE 2 causes the preferential control block 25 to activate the distance control block 24 to be ready for the distance control. The distance map is programmed so that the desirable distance DIS changes along a quadratic curve with an increase in preceding object vehicle speed VSPF. Following the determination of the desirable distance DIS between the two vehicles, the subject vehicle is controlled to increase the interval to the preceding object vehicle so as to follow the preceding object vehicle at the desirable distance DIS at step S12. In this instance, the distance control is differently performed according to danger levels of relative vehicle speeds REL between the two vehicles which are categorized into three zones. These zones include an extremely dangerous zone A for relative vehicle speeds at which the two vehicles decrease rapidly the interval between them, a dangerous zone B for relative vehicle speeds at which the two vehicles decrease slowly the interval between them, and a less dangerous zone C for relative vehicle speeds at which the two vehicles increase the interval between them. Specifically, the distance control is realized by causing the braking control system 3 to apply a brake in the extremely dangerous zone A; by simultaneously causing both the braking control system 3 and the electronic automatic transmission control system 2 to shift down and apply the brake in the dangerous zone B; and by performing passive speed control in the less dangerous zone C. When the passive speed control is conducted, the speed of subject vehicle is braked only by causing the throttle control system 1 to regulate throttle opening of the engine throttle so as to change the engine output, thereby changing the vehicle speed. That is, in the less dangerous zone C, neither the electronic automatic transmission control system 2 nor the braking control system 3 are used.

On the other hand, if the answer to the decision made at step S9 concerning the distance DIS between the two vehicles with respect to the predetermined distance Lo is "NO," this indicates that there is no preceding object vehicle running ahead within the predetermined distance Lo. Then, a decision is made at step S13 as to whether the control mode has been set to MODE 2. What this decision finds is the moment of disappearance of the preceding object vehicle out of the distance Lo during the distance control. If the answer to this decision is "NO," then, the distance control is discontinued and the cruising speed control is alternatively conducted at step S17 so as to keep the subject vehicle traveling at the preset cruising speed. This is realized with the preferential activation of the cruising speed control block 23 by the control block 2. If the answer to the decision made at step S13 is "YES," however, a decision is made at step S14 as to whether a predetermined time has passed after the moment of disappearance of the preceding subject vehicle during the distance control. If this answer is "NO," then, a target cruising speed VSPO is established in place of the preset cruising speed. In this instance, if the current subject vehicle speed VSP is equal to or higher than the current preceding object vehicle speed VSPF, the current preceding object vehicle speed VSPF is substituted for the target cruising speed VSPO. However, if the current subject vehicle speed VSP is lower than the current preceding object vehicle speed VSPF, the current subject vehicle speed VSP is substituted for the target cruising speed VSPO. In other words, the target cruising speed VSPO is set to either one of the preceding object vehicle speed VSPF and the subject vehicle speed VSP that is lower than the other. Then, the subject vehicle is controlled to retain the target cruising speed VSPO at step S17.

If the answer to the decision made at step S14 is "YES," that is, if the predetermined time has passed after the disappearance of the preceding object vehicle out of the sight of the laser range finder 7, then, after having set the control mode to MODE 1 for the speed control at step S16, the subject vehicle is controlled to travel at the preset cruising speed at step S17. The setting of MODE 1 causes the preferential control block 25 to activate the cruising speed control block 24 so as to keep the subject vehicle traveling at the preset cruising speed.

The target cruising speed VSPO may be set to another speed other than the preceding object vehicle speed VSPF and the subject vehicle speed VSP.

Figure 6:
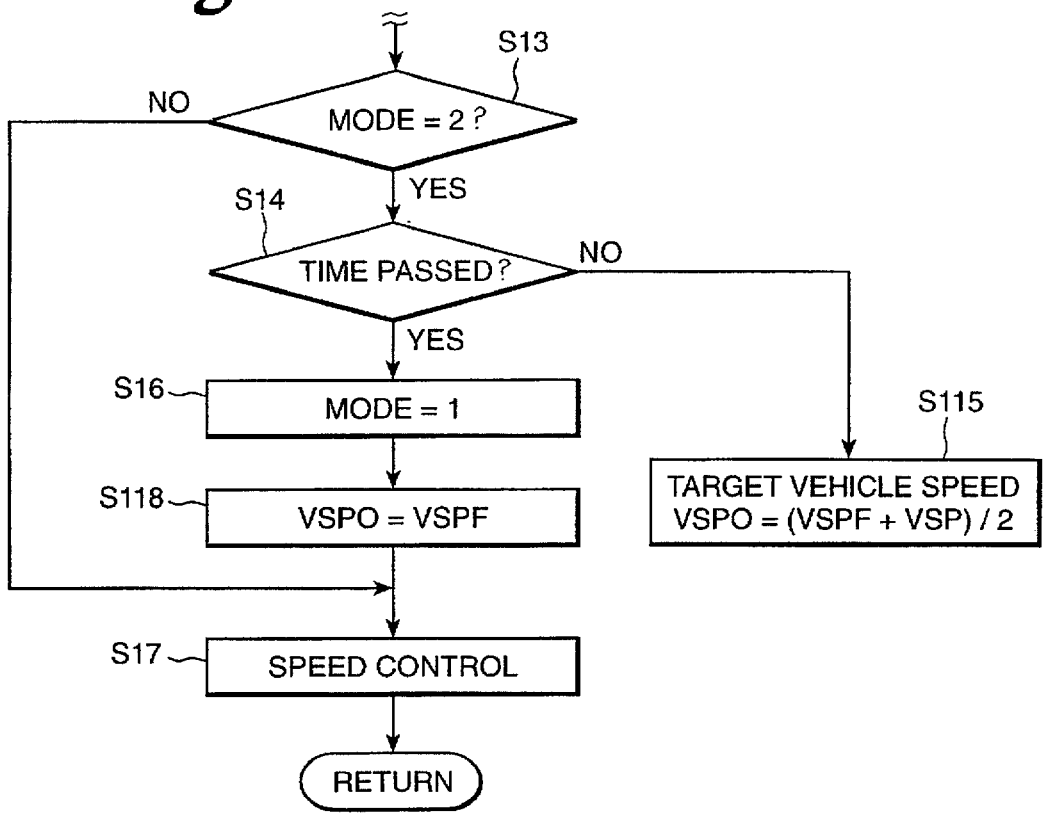
FIG. 6 is a flow chart showing a part of the drive speed control routine when a preceding vehicle is lost from sight.

Referring to FIG. 6, if the "NO" answer is provided to the decision made at step S14 concerning the lapse of the predetermined time after the disappearance of the preceding object vehicle out of the sight of the laser range finder 7, the target cruising speed VSPO is set to the middle speed between the subject vehicle speed VSP and the preceding object vehicle speed VSPF upon the disappearance of the preceding object vehicle speed out of the sight of the laser range finder 7 at step S115. Thereafter, when the predetermined time passes, after setting the control mode to MODE 1 at step S16, the target cruising speed VSPO is set to the preceding object vehicle speed VSPF at step S118. In this instance, even if the difference between preceding object vehicle speed VSPF and the subject vehicle speed VSP is large, the subject vehicle is controlled to attain gradually the same speed as the preceding object vehicle speed VSPF, preventing changing in speed rapidly and providing the improvement of safer driving control.

Figure 7:
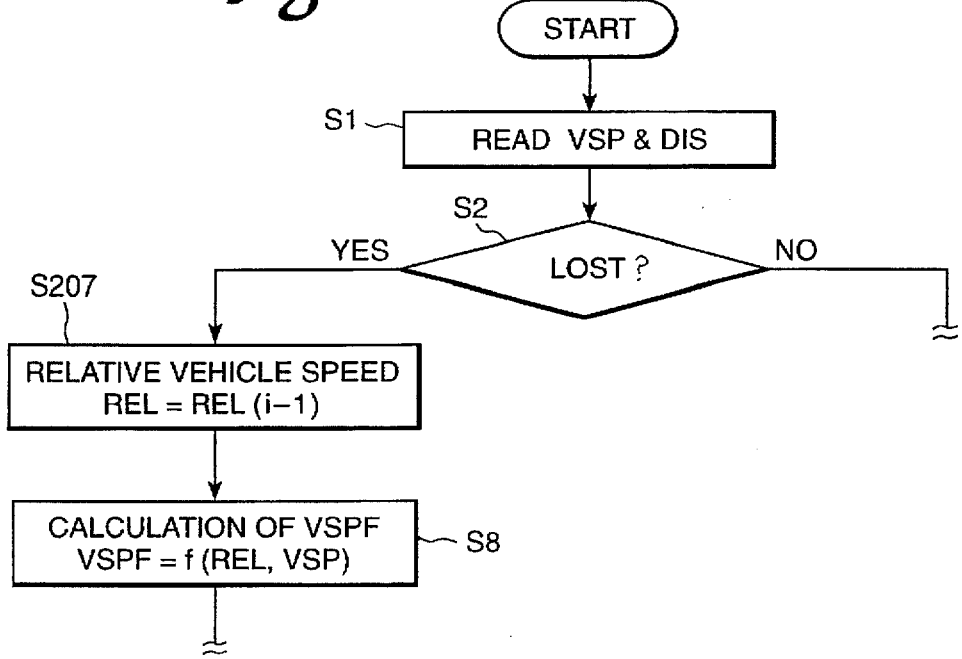
FIG. 7 is a flow chart showing a part of the drive speed control routine when a preceding vehicle is lost from sight.

In addition, when the laser range finder 7 has lost sight of the preceding object vehicle, the relative speed REL between the two vehicles may be otherwise obtained by simply using the relative speed REL(i−1) immediately before the sight loss without performing an extrapolation calculation, as shown at step S207 in FIG. 7.

With the drive control system according to the present invention, when the preceding object vehicle is missed or disappears out of the sight of the laser range finder 7, the vehicle is controlled to attain a target cruising speed VSPO which is established based on the speed of preceding object vehicle VSPF estimated from the current subject vehicle speed VSP and relative speed REL. As a result, even when the subject vehicle loses sight of the preceding object vehicle while it approaches the preceding object vehicle, the subject vehicle is controlled to increase its speed VSP without exceeding greatly the preceding object vehicle speed VSPF, preventing an extraordinarily rapid approach to the preceding object vehicle. In addition, because the target cruising speed VSPO is set to that one of the preceding object vehicle speed VSPF and the subject vehicle speed VSP that is lower than the other, even if the preceding object vehicle speed VSPF is wrongly judged to be higher than the subject vehicle speed VSP for some reason or other, for instance errors due to pulsations of signals from the various sensors and the accuracy in estimated preceding object vehicle speed, the subject vehicle is controlled to travel at the same vehicle speed as when the preceding object vehicle disappeared out of the sight of the laser range finder 7, preventing the vehicle from being wrongly accelerated. An improvement in safety driving control is thereby provided. Furthermore, when the preceding object vehicle disappears from the sight of the laser range finder 7, the preceding object vehicle speed VSPF is estimated based on relative speeds REL before rather than at the time of the disappearance disregarding the current relative speeds REL. A quite appropriate estimation of preceding vehicle speed is realized, therefore.

It is to be understood that although the present invention has been described with regard to preferred embodiments thereof, various other embodiments and variants may occur to those skilled in the art. Those other embodiments and variants which are within the scope and spirit of the invention are intended to be covered by the following claims.

What is claimed is:

1. A drive control system for a subject vehicle for performing a speed control for controlling the subject vehicle so that the subject vehicle travels at a desired cruising speed and a distance control for controlling the subject vehicle so that the subject vehicle travels at a desired safe distance from a preceding object vehicle, said drive control system comprising:

(a) a range finder which detects a distance between the subject vehicle and a preceding object vehicle running ahead and within sight of the range finder, and (b) control means for estimating an estimated speed of said preceding object vehicle after said range finder loses sight of the preceding object vehicle during said distance control corresponding to at least one actual driving condition of said preceding object vehicle before said range finder loses sight of said preceding object vehicle and a target cruising speed which the subject vehicle ought to attain according to the estimated speed of said preceding object vehicle, and controlling the subject vehicle so that it travels at said target cruising speed by causing said drive control system to perform said speed control.

2. A drive control system as defined in claim 1, wherein said control means establishes said target cruising speed to be a lower one of a speed of said subject vehicle and said estimated speed of said preceding object vehicle.

3. A drive control system as defined in claim 1, wherein said control means establishes, as said target cruising speed, (1) a middle speed between a speed of said subject vehicle and said estimated speed of said preceding object vehicle until a predetermined time has passed after losing sight of the preceding object vehicle, and (2) said estimated speed of said preceding object vehicle after said predetermined time has passed after losing sight of the preceding object vehicle.

4. A drive control system as defined in claim 1, wherein said control means estimates said estimated speed by subtracting a relative speed between said subject vehicle and said preceding object vehicle, before said range finder loses sight of the preceding object vehicle, from a speed of said subject vehicle.

5. A drive control system as defined in claim 4, wherein said control means estimates said estimated speed by subtracting a plurality of preceding relative speeds between the vehicles before said range finder loses sight of the preceding object vehicle from a speed of said subject vehicle in an extrapolating method.

6. A drive control system as defined in claim 4, wherein said control means substitutes a last relative speed between the vehicles right before said range finder loses sight of the preceding object vehicle for said speed of said preceding object vehicle.

7. A drive control system as defined in claim 1, wherein said distance control is performed differently according to a plurality of danger levels of relative speeds between said subject vehicle and said preceding object vehicle vehicles by controlling, in combination, an opening of an engine throttle, application of a brake and shifting of an automatic transmission.

8. A drive control system as defined in claim 7, wherein said danger levels are categorized into (1) an extreme danger zone for relative speeds at which the vehicles lessen rapidly said distance therebetween, a danger zone for relative speeds at which the vehicles lessen slowly said distance therebetween, and a low danger zone for relative vehicle speeds at which the vehicles increase said distance therebetween.

9. A drive control system as defined in claim 1, wherein said range finder comprises a laser radar range finder having a predetermined angle of sight.

10. A drive control system for a subject vehicle for performing a speed control for controlling the subject vehicle so that the subject vehicle travels at a desired cruising speed and a distance control for controlling the subject vehicle so that the subject vehicle travels at a desired safe distance from a preceding object vehicle, said drive control system comprising:

(a) a range finder which detects a distance between the subject vehicle and the preceding object vehicle running ahead and within sight of the range finder; and (b) a control system for (1) detecting an actual relative speed between said subject vehicle and said preceding object vehicle, before said range finder loses sight of said preceding object vehicle, (2) establishing a target cruising speed which the subject vehicle ought to attain based on said relative speed when said range finder loses sight of the preceding object vehicle during said distance control, and (3) controlling the subject vehicle so that it travels at said target cruising speed by causing said drive control system to perform said speed control.

11. A drive control system as defined in claim 10, wherein said control system detects a difference between a speed of said subject vehicle and said relative speed for said target cruising speed.

12. A drive control system as defined in claim 10, wherein said control system establishes said target cruising speed based on a plurality of preceding relative speeds between said subject vehicle and said preceding object vehicle before said range finder loses sight of said preceding object vehicle.

13. A drive control system as defined in claim 10, wherein said control system substitutes a latest relative speed between said subject vehicle and said preceding object vehicle immediately before said range finder loses sight of said preceding object vehicle for a speed of said preceding object vehicle.

14. A drive control system as defined in claim 10, wherein said drive control system performs said distance control differently according to a plurality of danger levels of relative speed between said subject vehicle and said preceding object vehicle by controlling, in combination, an engine throttle opening, application of a brake and a shift of an automatic transmission.

15. A drive control system as defined in claim 14, wherein said control system categorizes said danger levels into extreme danger speeds, at which a distance between said subject vehicle and said preceding object vehicle decreases rapidly, danger speeds, at which a distance between said subject vehicle and said preceding object vehicle decreases slowly, and low danger speeds, at which a distance between said subject vehicle and said preceding object vehicle increases.

16. A drive control system as defined in claim 10, wherein said range finder comprises a laser radar range finder having a predetermined angle of sight.

* * * * *